(12) United States Patent
Husain

(10) Patent No.: US 9,948,602 B2
(45) Date of Patent: *Apr. 17, 2018

(54) GENERATION OF PATHS THROUGH GRAPH-BASED DATA REPRESENTATION

(71) Applicant: Netflix, Inc., Los Gatos, CA (US)

(72) Inventor: Jafar Husain, San Francisco, CA (US)

(73) Assignee: Netflix, Inc., Los Gatos, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 14/031,748

(22) Filed: Sep. 19, 2013

(65) Prior Publication Data
US 2014/0280675 A1 Sep. 18, 2014

Related U.S. Application Data

(60) Provisional application No. 61/793,665, filed on Mar. 15, 2013.

(51) Int. Cl.
*H04L 29/12* (2006.01)
*G06F 17/30* (2006.01)
*H04N 21/472* (2011.01)
*G06F 12/0811* (2016.01)
*G06F 12/0817* (2016.01)
*H04L 12/701* (2013.01)

(52) U.S. Cl.
CPC ...... *H04L 61/2596* (2013.01); *G06F 12/0811* (2013.01); *G06F 12/0817* (2013.01); *G06F 17/30831* (2013.01); *G06F 17/30858* (2013.01); *H04L 45/00* (2013.01); *H04N 21/47202* (2013.01)

(58) Field of Classification Search
CPC ......... G06F 17/30961; G06F 17/30943; G06F 17/30858; G06F 17/30849; G06F 17/30831; H04L 61/3596; H04N 21/47202
See application file for complete search history.

(56) References Cited

U.S. PATENT DOCUMENTS 6,128,652 A 10/2000 Toh et al.
6,279,007 B1 * 8/2001 Uppala ............. G06F 17/30961
7,640,270 B2 * 12/2009 Chun ................ G06F 17/30817
9,104,593 B2 * 8/2015 Thompson .......... G06F 12/1027
(Continued)

OTHER PUBLICATIONS

International Search Report for Application No. PCT/2014022754, dated Aug. 4, 2014.

*Primary Examiner* — Aaron Strange
(74) *Attorney, Agent, or Firm* — Artegis Law Group, LLP

(57) ABSTRACT

Embodiments of the invention generally provide a method, a computing system, and a computer-readable medium configured to generate requests for payload data through a graph-based data representation. The computer-implemented method includes generating a first request for translation that specifies a first path configured to identify first payload data associated with a graph object. The computer-implemented method further includes transmitting the first request to a path evaluator for translation. The computer-implemented method also includes receiving a first translated path based on the first path and including an initial translated portion and a final untranslated portion, from the path evaluator. The computer-implemented method further includes receiving the first payload data from the path evaluator.

17 Claims, 15 Drawing Sheets

(56) References Cited

U.S. PATENT DOCUMENTS

| | | |
|---|---|---|
| 2004/0054777 A1 | 3/2004 | Ackaouy et al. |
| 2011/0119245 A1* | 5/2011 | Sargeant .......... G06F 17/30451 707/706 |
| 2012/0239731 A1 | 9/2012 | Shyamsunder et al. |

* cited by examiner

GENERATION OF PATHS THROUGH GRAPH-BASED DATA REPRESENTATION

CROSS-REFERENCE TO RELATED APPLICATIONS

This application claims benefit of U.S. provisional patent application Ser. No. 61/793,665, filed Mar. 15, 2013 and titled "Graph-Based Data Representation for Cache Coherency." The subject matter of this related application is hereby incorporated herein by reference.

BACKGROUND OF THE INVENTION

Field of the Invention

Embodiments of the present invention relate generally to data transmission over computer networks and, more particularly, to generation of paths through graph-based data representation.

Description of the Related Art

Web-based applications or web applications provide services, such as streaming video and/or streaming audio services, in a distributed manner over the Internet. Additionally, a large number of such web-based applications communicate over the Internet via hypertext transfer protocol (HTTP), a ubiquitous and well-supported specification for transferring data over the Internet. In such applications, a client machine requests one or more resources, and a server machine provides the requested resources in response. Typical network latency on the order of tens of milliseconds or more generally means that each such request requires a relatively large amount of time to be fulfilled.

To address such latencies, caching schemes are oftentimes employed where frequently used copies of resources are stored in a memory local to the client machine for later quick retrieval. However, currently available caching schemes are not well suited to handling a large number of concurrent data requests over the Internet while also being compatible with HTTP.

For example, web browsers have built-in caching systems that are compatible with HTTP. When a web browser retrieves a requested web page, the web browser stores the retrieved web pages in a local cache, with the uniform resource locator (URL) acting as the cache key for the web page stored in the cache. Unfortunately, HTTP message headers are relatively bulky such that, in many cases, the size of the data message payload is dwarfed by the size of the HTTP header. Thus, when small messages are transferred with HTTP, a relatively large amount of bandwidth is consumed only for the HTTP header, which includes no payload data.

Further, web browsers typically support only a limited number of concurrent HTTP connections. Thus, if a web-based application wishes to request a large number of resources via HTTP, then the web-based application cannot transmit all of those requests in parallel. Rather, the web-based application must wait until some of the requests complete until sending out additional requests.

Additionally, individual HTTP requests can only be processed in serial. This means that requests cannot be processed out of order in order to return quickly-processed requests earlier than more slowly-processed requests. For these reasons, built-in web browser caching systems are not structured to handle multiple concurrent data requests via HTTP effectively.

As the foregoing illustrates, what is needed in the art is an improved approach for handling multiple concurrent data requests over networks, such as the Internet.

SUMMARY

Embodiments of the invention generally provide a method, a computing system, and a computer-readable medium configured to generate requests for payload data through a graph-based data representation.

In one embodiment, a computer-implemented method is provided. The computer-implemented method includes generating a first request for translation that specifies a first path configured to identify first payload data associated with a graph object. The computer-implemented method further includes transmitting the first request to a path evaluator for translation. The computer-implemented method also includes receiving a first translated path based on the first path and including an initial translated portion and a final untranslated portion, from the path evaluator. The computer-implemented method further includes receiving the first payload data from the path evaluator.

In another embodiment, a computer system is provided. The computer system includes a computing device. The computing device is configured to generate a first request for translation that specifies a first path configured to identify first payload data associated with a graph object. The computing device is also configured to transmit the first request to a path evaluator for translation. The computing device is further configured to receive a first translated path based on the first path and including an initial translated portion and a final untranslated portion, from the path evaluator. The computing device is also configured to receive the first payload data from the path evaluator.

In yet another embodiment, a computer-readable medium is provided. The computer-readable medium stores instructions that when executed by a processor, cause a computer system to perform certain steps. The steps include generating a first request for translation that specifies a first path configured to identify first payload data associated with a graph object. The steps further include transmitting the first request to a path evaluator for translation. The steps also include receiving a first translated path based on the first path and including an initial translated portion and a final untranslated portion, from the path evaluator. The steps further include receiving the first payload data from the path evaluator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Among other things, embodiments of the present invention are directed towards associating payload data with a unique path through a graph object. Other paths through the graph may exist, but are all "translated" to the unique path. The unique path may act as the cache key in a caching scheme. By translating all paths that are not the unique path to the unique path, only a single copy of the payload data is maintained in the graph object, which maintains cache coherency. Furthermore, by permitting more paths than only the unique path to access the payload data, the present invention allows flexibility in the manner in which the payload data is accessed.

System Overview

Figure 1:
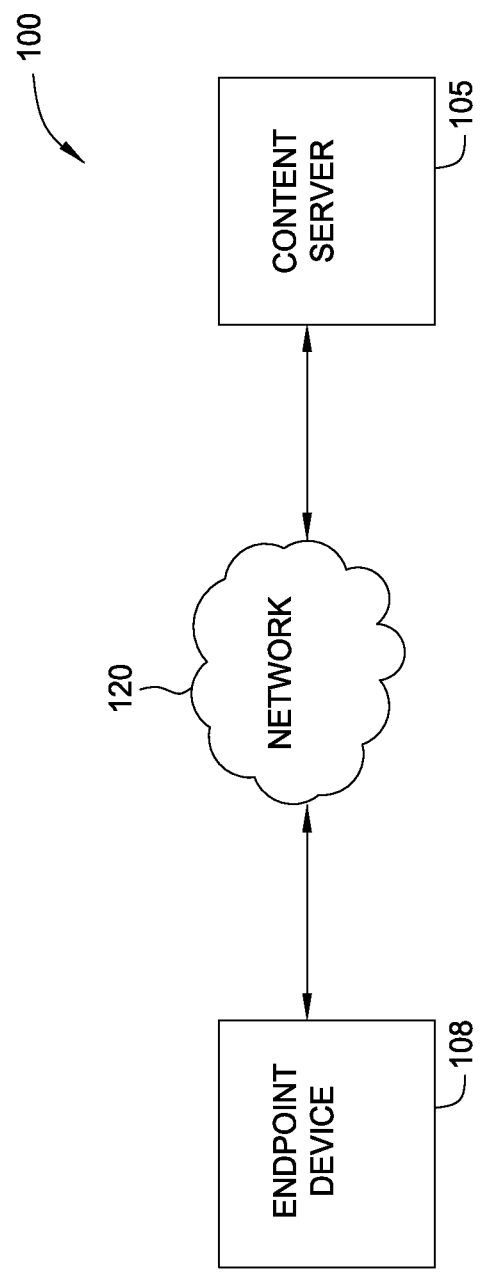
FIG. 1 illustrates an example computing infrastructure configured to provide content to endpoint device, according to one embodiment of the invention.

FIG. 1 illustrates an example computing infrastructure 100 used to provide content to endpoint device 108, according to one embodiment of the invention. As shown, the computing infrastructure 100 includes a content server 105 and endpoint device 108, each connected to a communications network 120.

The endpoint device 108 communicates with the content server 105 over the network 120 to download content, also referred to as "payload data". In various embodiments, the payload data may include one or more of text data, graphical data, video data, or audio data.

Content server 105 includes a computing system configured to transmit content to endpoint device 108. For example, content server 105 may include a web-server, database, and application server configured to respond to requests for content received from endpoint device 108. The content itself may be distributed from the content server 105 or through broader content distribution networks. For example, in one embodiment, the content server 105 allows a viewer to authenticate themselves to a content provider (e.g., using a username and password). Once a given viewer is authenticated, the content server 105 may provide content to endpoint device 108.

In one embodiment, the endpoint device 108 may be a computer system, a set top box, a mobile device such as a mobile phone, or any other technically feasible computing platform that has network connectivity and is coupled to or includes a display device and speaker device for presenting content, such as still image, video, and/or audio content.

Figure 2:
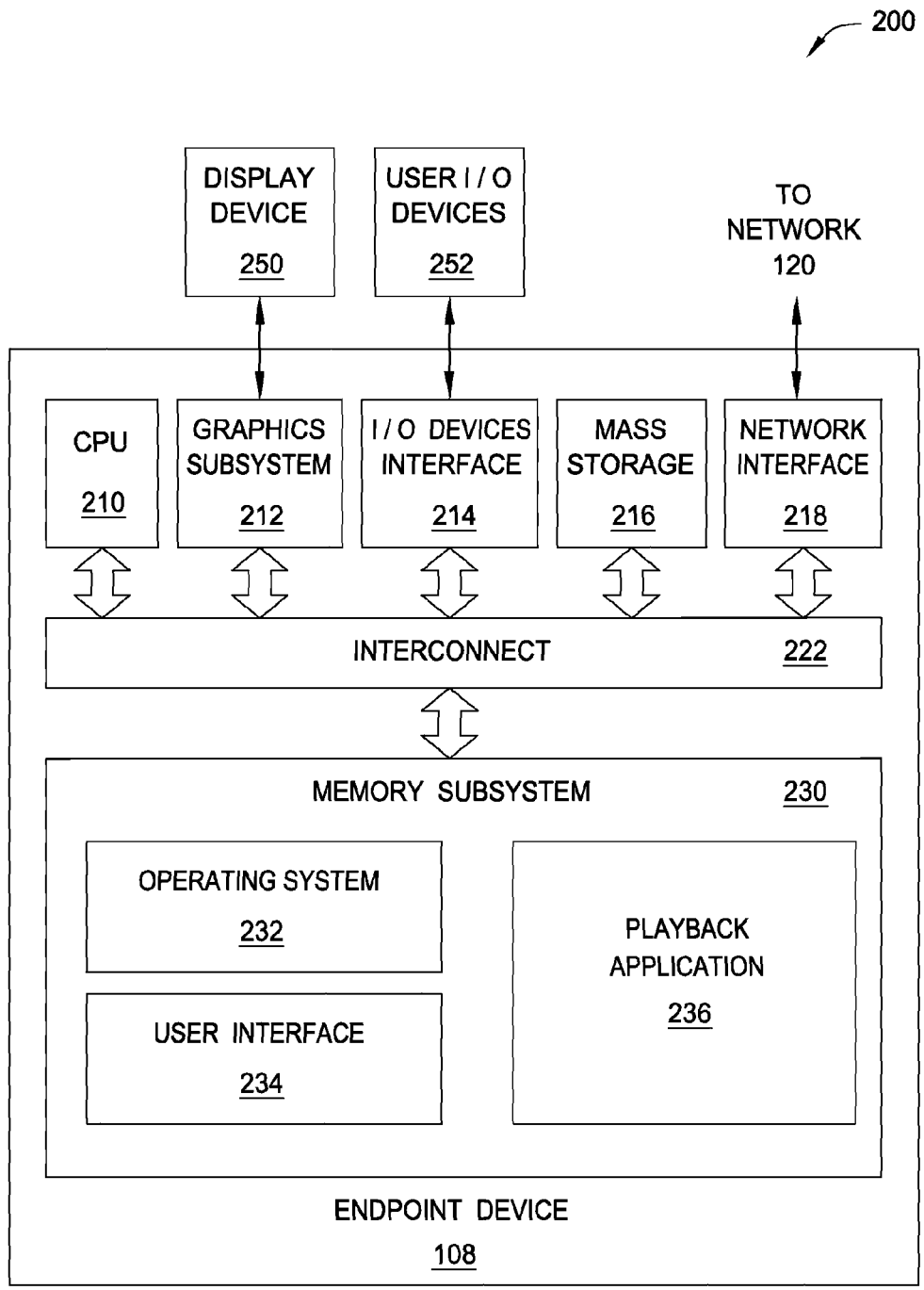
FIG. 2 is a block diagram illustrating components of the endpoint device of FIG. 1, according to one embodiment of the present invention.

FIG. 2 is a block diagram illustrating components of the endpoint device 108 of FIG. 1, according to one embodiment of the present invention. As shown, the components 200 include, without limitation, a central processing unit (CPU) 210, a graphics subsystem 212, an input/output (I/O) device interface 214, a mass storage unit 216, a network interface 218, an interconnect 222, and a memory subsystem 230. Depending on the embodiment, the endpoint device may be, without limitation, a conventional computing system, e.g., a desktop PC, a laptop computer, or home theatre PC (HTPC), or any of a variety of end-user client devices, including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

In some embodiments, the CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218 and memory subsystem 230.

In some embodiments, the graphics subsystem 212 is configured to generate frames of video data and transmit the frames of video data to display device 250. In some embodiments, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal.

In alternative embodiments, the display device 250 may include the speaker. A television is an example of a device known in the art that can display video frames and generate an acoustic output.

A mass storage unit 216, such as a hard disk drive or flash memory storage drive, is configured to store non-volatile data. A network interface 218 is configured to transmit and receive packets of data via the network 120. In some embodiments, the network interface 218 is configured to communicate using the well-known Ethernet standard. The network interface 218 is coupled to the CPU 210 via the interconnect 222.

In some embodiments, the memory subsystem 230 includes programming instructions and data that comprise an operating system 232, a user interface 234 and a playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 236 is configured to request and receive content from the content server 105 via the network interface 218. Further, the playback application 236 is configured to interpret the content and present the content via display device 250 and/or user I/O devices 252.

Figure 3:
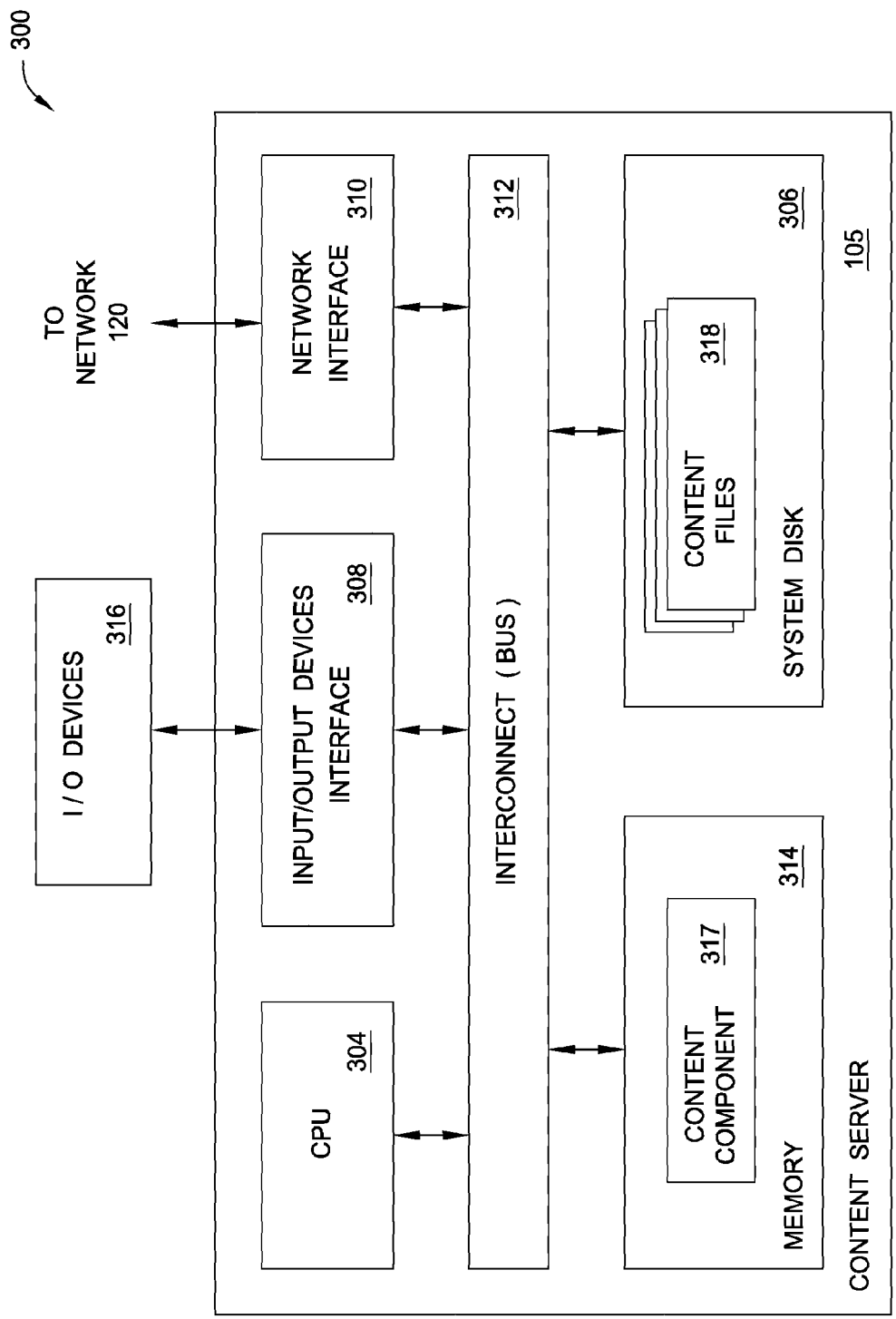
FIG. 3 is a block diagram illustrating components of the content server of FIG. 1, according to one embodiment of the present invention.

FIG. 3 is a block diagram illustrating components of the content server 105 of FIG. 1, according to one embodiment of the present invention. As shown, the components 300 includes a central processing unit (CPU) 304, a system disk 306, an input/output (I/O) devices interface 308, a network interface 310, an interconnect 312, and a system memory 314.

The CPU 304 is configured to retrieve and execute programming instructions stored in the system memory 314. Similarly, the CPU 304 is configured to store application data and retrieve application data from the system memory 314. The interconnect 312 is configured to facilitate transmission of data, such as programming instructions and application data, between the CPU 304, the system disk 306, I/O devices interface 308, the network interface 310, and the system memory 314. The I/O devices interface 308 is configured to receive input data from I/O devices 316 and transmit the input data to the CPU 304 via the interconnect 312. For example, I/O devices 316 may include one or more buttons, a keyboard, and a mouse or other pointing device. The I/O devices interface 308 is also configured to receive output data from the CPU 304 via the interconnect 312 and transmit the output data to the I/O devices 316. The system disk 306, such as a hard disk drive or flash memory storage drive or the like, is configured to store non-volatile data such as content. The content can then be retrieved by the endpoint device 108 via the network 120. In some embodiments, the network interface 310 is configured to operate in compliance with the well-known Ethernet standard.

The system memory 314 includes a content component 317 that includes instructions for serving requests for content. When content component 317 receives a request for content, content component 317 accesses a corresponding content file in the system disk 306 and transmits the content file through network 120 to endpoint device 108. The system disk 306 includes one or more content files 318. Content files 318 may include content data such as such as textual data, video data, and audio data.

Graph-Based Data Representation for Cache Coherency

Figure 4:
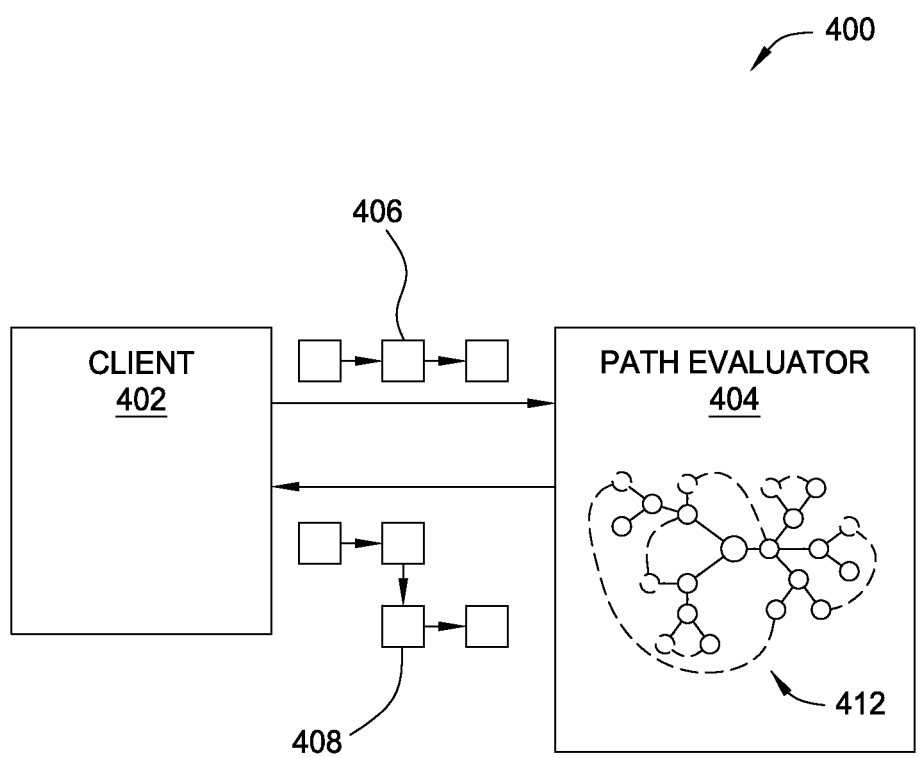
FIG. 4 illustrates system including a client and a path evaluator, according to one embodiment of the present invention.

FIG. 4 illustrates a system 400 including a client 402 and a path evaluator 404, according to one embodiment of the present invention. In operation, the client 402 generates a path 406 and provides the path 406 to the path evaluator 404 for evaluation. The path evaluator 404 translates the path 406 to generate a translated path 408. The path evaluator 404 returns the translated path 408 and a path-bound value associated with the translated path 408 to the client 402. Conceptually, a path 406 is a mechanism by which the client 402 requests a particular piece of payload data (also referred to as the "path-bound value"). The path 406 includes a sequence of keys. The keys identify the payload data based on a hierarchical relationship. In other words, the sequence of keys in a path specifies a location in a hierarchical data set represented by graph object 412.

Client 402 does not necessarily know all of the information in the graph object 412. Instead, the client 402 generates the path 406 based only on limited information that the client 402 has. In some embodiments, keys identify categories in the hierarchical data set. For example, a first key in a sequence of keys identifies the category of "video lists," the second key in the sequence of keys identifies the category of "action" (which resides in "video lists") and the third key specifies a particular entry in the category of "action," for example, with a number. A fourth key may be "title," which specifies a particular entry within the movie specified by the third key. The payload data requested by a client is also referred to as a "path-bound value" herein. Such a value is bound, in the graph object 412, to the path with which the value is associated.

In response to receiving the path 406, the path evaluator 404 evaluates the path 406 and provides an evaluated path 408, which is a unique path for a particular piece of payload data, back to the client 402. The path evaluator 404 also provides a path-bound value back to the client 402. The path evaluator 404 has knowledge, represented by graph object 412, of how to translate a path 406 provided by the client 402 into a unique path. A "unique path" is a path that is deemed to be unique in the graph object 412. Multiple paths may exist for any particular piece of payload data. However, only one unique path exists for that particular piece of payload data, and all paths that are not the unique path are translated by the path evaluator 404 into the unique path. Associating a single unique path with each piece of payload data allows the client 402 to maintain a cache of requested payload data in which only a single cache key—the unique path—is associated with each piece of payload data.

The client 402 may be embodied as a software module executing on either the endpoint device 108 or the content server 105. Similarly, the path evaluator 404 may be embodied as a software module executing on either the endpoint device 108 or the content server 105. Path evaluators 404 may execute in a wide variety of contexts. For example, a path evaluator 404 may execute on the same physical computing device as a client 402, such as endpoint device 108, or content server 105. A path evaluator 404 may also execute on a different machine as a client 402. For example, a path evaluator 404 may execute on content server 105 while the client 402 executes on the endpoint device 108.

The path evaluator 404 may exhibit different behaviors depending on the context in which the path evaluator 404 is operating, and the specific requirements of the path evaluator 404.

A path evaluator 404 operating in any context generally implements the following functionality. First, a path evaluator 404 allows a client 402 to request payload data based on a path 406, as described above. Second, path evaluators 404 allow a client 402 to store a particular piece of payload data in the graph object 412, and to specify a path associated with that piece of payload data. Third, path evaluators 404 allow a client 402 to delete a particular piece of payload data from a graph object 412. Fourth, in some embodiments, path evaluators 404 allow clients 402 to request execution of a particular portion of executable code associated with a particular path.

Figure 5A:
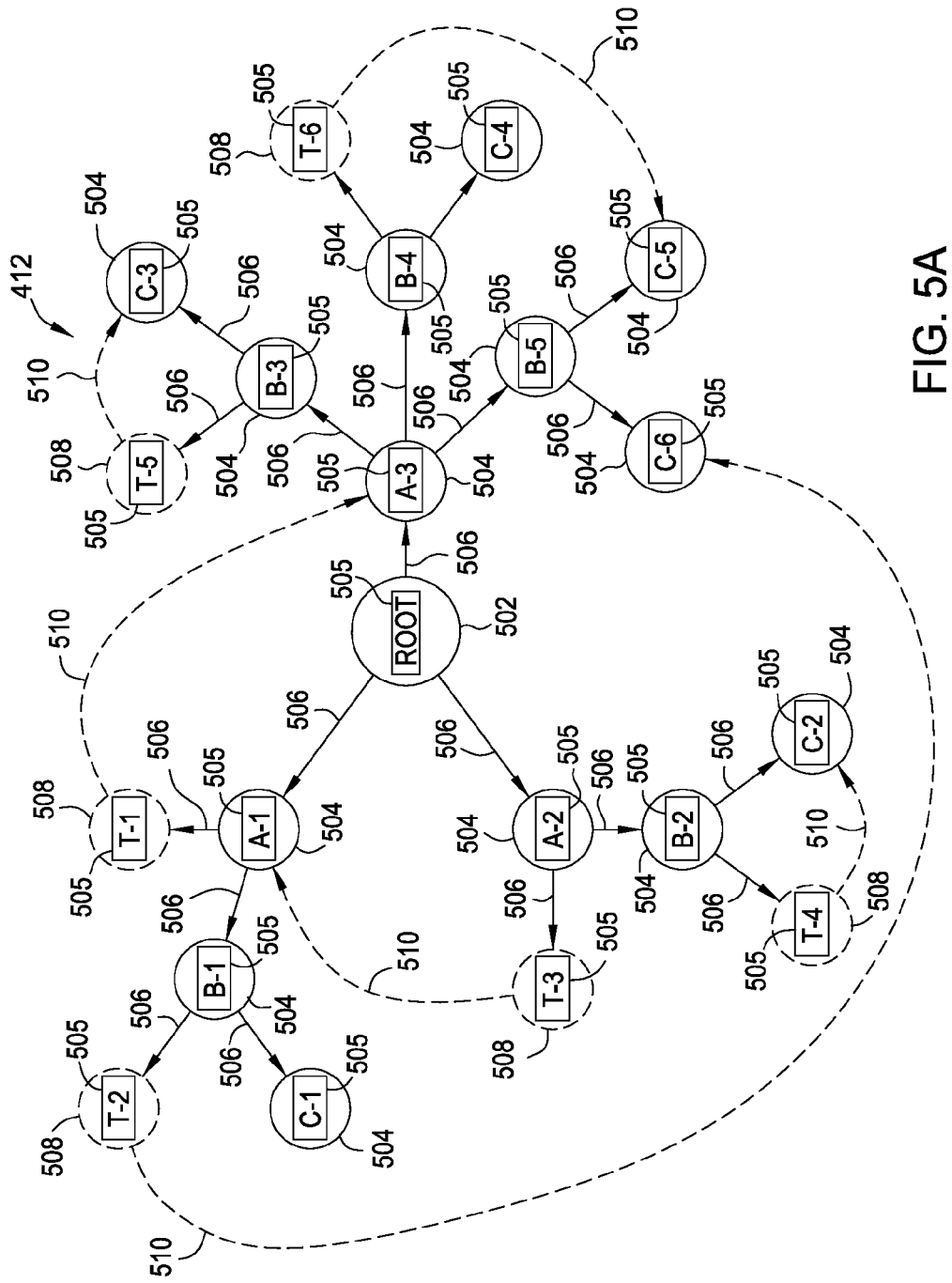
FIG. 5A illustrates an example of a graph object, according to one embodiment of the present invention.

FIG. 5A illustrates an example of a graph object 412, according to one embodiment of the present invention. As shown, the graph object 412 includes a root node 502, normal nodes 504, directed edges 506, translation nodes 508, and translation references 510.

The graph object 412 includes normal nodes 504 and translation nodes 508. Normal nodes 504 may be connected to other nodes, either other normal nodes 504 or translation nodes 508, by directed edges 506. Each translation node 508 includes a translation reference 510 that points to a normal node 504. Both normal nodes 504 and translation nodes 508 include keys 505. Keys 505 are identifiers by which the client 402 can specify a sequence of nodes through graph object 412. The path 406 generated by the client 402 includes a sequence of keys 505 which together specifies a particular node in the graph object 412.

Conceptually, the graph object 412 can be thought of as having a number of different levels, starting at the root node 502. Directed edges 506 that extend from the root node point to normal nodes 504 in a first level. Directed edges 506 that extend from a normal node 504 in the first level point to normal nodes 504 in a second level. Directed edges 506 that extend from normal nodes 504 in the second level point to normal nodes 504 in a third level, and so on. In the graph object 412 shown, normal nodes 504 in the first level are indicated with label "A-X" where "X" is a number, normal nodes 504 in the second level are indicated with "B-X", and normal nodes 504 in the third level are indicated with "C-X."

Each normal node 504 in the graph object 412 is associated with a unique path through the graph object 412. In other words, for each normal node 504, there is only one path through the graph object 412 to that normal node 504 that does not include a translation node 508. So, for example, a normal node 504 in the first level would have a corresponding unique path of "Root node, node in the first level." Similarly, a normal node 504 in the second level would have a corresponding unique path of "Root node, node in the first level, node in the second level." There may be multiple paths through the graph object 412 to a normal node 504 that include at least one translation node 508. However, any path that includes a translation node 508 is translated into a unique path by the path evaluator 404.

The root node 502 in the graph object 412 represents a starting location for paths specified by a client 402. A path specified by a client 402 begins at the root node 502, and specifies additional nodes that flow from root node 502. A path may specify a sequence of nodes connected by directed edges 506. For example, a path may include the sequence "Root, A-1, B-2, C-1." A path cannot, however, specify a sequence of nodes connected by translation references 510.

For example, a path provided by a client 402 cannot include the sequence "Root, A-1, T-1, A-3." This restriction is because translation references 510 conceptually represent data that the client 402 does not know. In other words, because the client 402 is requesting translation of a path including a translation node 508, the client 402 cannot know about the translation reference that extends from the translation node 508. Examples of translations are provided with reference to FIGS. 5B and 5C.

In operation, the path evaluator 404 evaluates the path 406 provided by the client 402 by traversing through the graph object 412 as specified by the path 406 and beginning at the root node 502. The path evaluator 404 analyzes the path 406 to translate the path 406 into a fully translated path, which is a path that is deemed to be unique, and is also referred to herein as a unique path. To convert the path 406 provided by the client into a unique path, the path evaluator 404 performs a series of translation iterations. In each of the iterations, the path evaluator generates either a partially translated path or a fully translated path. If the path evaluator 404 generates a partially translated path, then the path evaluator continues to translate the path until the path evaluator 404 generates a fully translated path.

In each translation iteration, the path evaluator 404 converts at least a portion of the path being analyzed into a different sequence of keys 505. More specifically, the path evaluator 404 traverses the graph object 412 as specified by the keys 505 in the path (either the initial path 406 provided by the client or a partially translated path) until the path evaluator 404 reaches a translation node 508 in graph object 412. When the path evaluator 404 reaches a translation node 508, the path evaluator 404 follows the translation reference 510 of the translation node 508 to arrive at another node (a "translated node") in the graph object 412. The path evaluator 404 determines the path—the sequence of keys 505—through the graph object 412 that corresponds to the translated node. The path evaluator 404 then replaces the portion of the path being analyzed up to and including the translation node 508 that was translated with the path that corresponds to the translated node 508 to generate a new path. If the generated path still includes a sequence of keys 505 that corresponds to a translation node 508 in the graph object 412, then the generated path is a partially translated path and the path evaluator 404 continues to translate the path by beginning a new translation iteration. If the generated path does not refer to any translation nodes 508, then the path is a fully translated path, which is a unique path, and the path evaluator 404 returns the unique path to the client 402.

When the path evaluator 404 translates the path 406 provided by the client 402, the path evaluator 404 notes any translations made. The path evaluator 404 transmits these translations to the client 402. Each translation includes the portion of the analyzed path that was translated, both before translation (i.e., up to the translation node), and after translation (i.e., the resulting path up to the translated node). The purpose of returning path translations is to allow the client 402 to store these translations in a cache, so that the client 402 may determine translations for a particular path at a future time without consulting path evaluator 404.

Each node (normal node 504 or translation node 508) in the graph object 412 may include one or more path-bound values. A path-bound value is the payload data requested by the client. A path-bound value is therefore a piece of data that the graph object 412 indicates as being logically associated with a particular node in the graph object 412. When the client 402 requests translation of path 406 from path evaluator 404, the client may also request the path-bound value associated with the path 406 for which translation is requested. The path evaluator 404 provides the requested path-bound value in response to the request for the path-bound value. The client 402 can also cache the path-bound value for future retrieval. As discussed in further detail below with respect to FIG. 9, the cache key for the requested path-bound value is the translated unique path. Because the translated unique path is unique, only one cache entry for that particular path-bound value is stored, which helps to maintain cache coherency by preventing the cache from storing multiple copies of the same path-bound value.

The knowledge possessed by the path evaluator 404—i.e., represented by graph object 412—may be algorithmic, explicitly stored, or a combination thereof. Algorithmic knowledge refers to computer-executable code that can generate a translation for a particular path requested by a client 402 into a path that is deemed to be unique. Explicit knowledge refers to data explicitly recorded in a data store that corresponds to the nodes of the graph object 412, including keys 505, path-bound values, normal nodes 504, translation nodes 508, directed edges 506, and translation references 510. Knowledge may be a combination of algorithmic and explicit in that the path evaluator 404 may refer both to computer-executable code as well as data recorded in a data store to evaluate paths provided by the client 402.

Figure 5B:
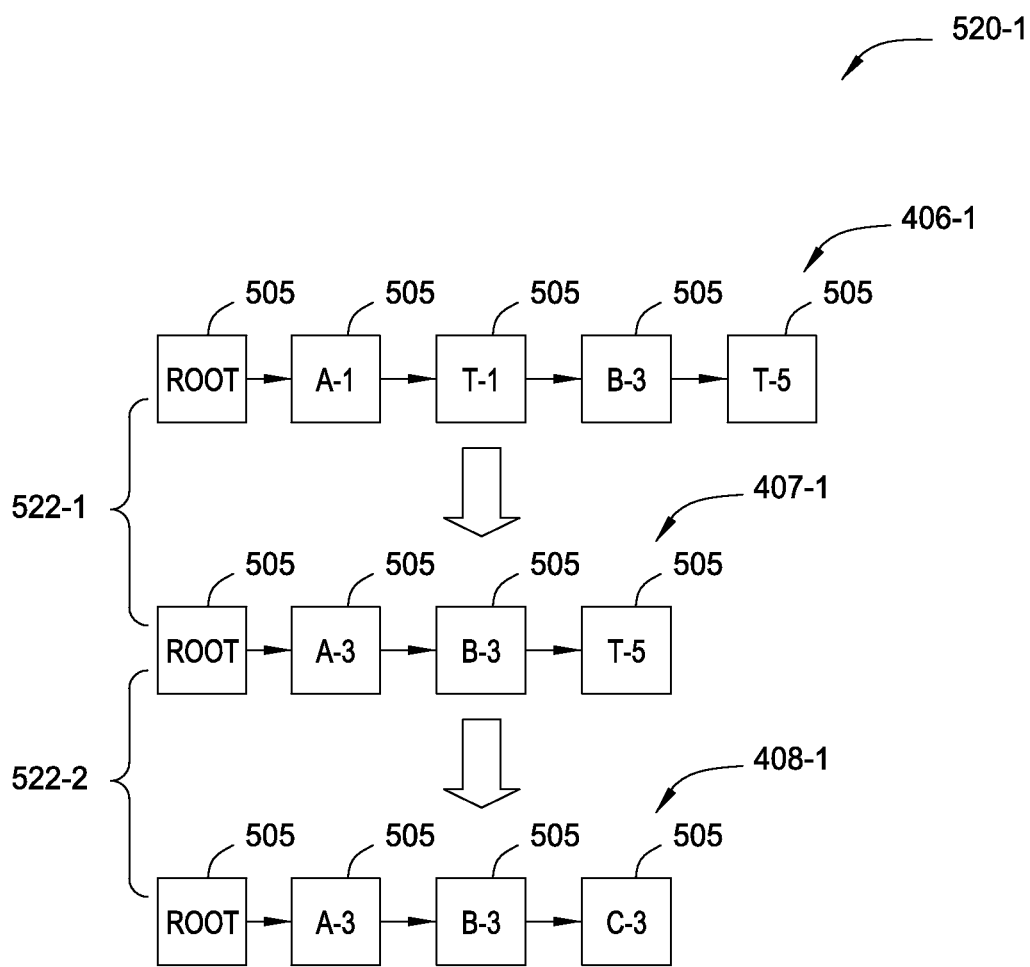
FIG. 5B illustrates an example translation of an untranslated path, according to one embodiment of the present invention.

FIG. 5B illustrates an example translation 520-1 of an untranslated path, according to one embodiment of the present invention. As shown, the translation 520-1 depicts an initial path 406-1 provided by a client 402, a partially translated path 407-1, and a fully translated path 408-1.

When the client 402 provides the initial path 406-1 to the path evaluator 404, the path evaluator 404 examines the graph object 412 to translate the path 406-1. The path evaluator 404 begins at the root node, and follows the nodes of the graph object 412 as specified by the path 406-1. The path evaluator 404 traverses the graph object 412 from the root node, to A-1, which is not a translation node, and then traverses to T-1, which the path evaluator 404 determines is a translation node. Because T-1 is a translation node, the path evaluator 404 follows the translation reference 510 of T-1 to arrive at A-3. The path evaluator 404 then generates partially translated path 407-1, by substituting all of the keys 505 in initial path 406-1 up to and including the key 505 that refers to the translation node T-1 with the unique path of the destination of the translation reference 510 of T-1. In other words, the path evaluator 404 substitutes "Root, A-1, T-1" with "Root, A-3," because "Root, A-3" is the unique path of A-3. The path evaluator 404 then appends the remainder (B-3, T-5) of the initial path 406-1 to the translated portion to generate the partially translated path 407-1. Thus, partially translated path 407-1 is the unique path of A-3 (Root, A-3) followed by the remainder as described above, meaning that partially translated path 407-1 is "Root, A-3, B-3, T-5."

The path evaluator 404 notes the translation 522-1 described above, which includes an indication that initial path 406-1 translates to partially translated path 407-1. In some embodiments, the path evaluator 404 transmits this translation 522-1 immediately to the client 402, while in other embodiments, the path evaluator 404 stores this translation 522-1 for transmission to the client 402 at a later time. Transmitting the translations 522 to the client 402 at a later time is described in greater detail below with respect to FIG. 8.

The path evaluator 404 next traverses through the nodes specified by the partially translated path 407-1 and examines the graph object 412 to determine that the partially translated path 407-1 refers to translation node 508 T-5. The path evaluator 404 examines the graph object 412 and determines that the translation reference 510 of translation node 508 T-5 points to normal node 504 C-3. The path evaluator 404 then determines that the path of C-3 is "Root, A-3, B-3, C-3" and substitutes all keys 505 in the partially translated path 407-1 up to the translation node T-5 with the path of C-3. Because the translation node 508 T-5 is the final key 505 in intermediate path 407-1, nothing is appended to this converted path. Further, path evaluation is complete because there are no more keys 505 in the intermediate path 407-1 after the translation node T-5. The fully translated path 408 is "Root, A-3, B-3, C-3." Again, the path evaluator 404 stores the translation 522-2 between partially translated path 407-1 and fully translated path, for transmission to client 402 as described above.

Embodiments of the inventive techniques presented above are now discussed in the context of an extension to JavaScript Object Notation (JSON), referred to herein as JavaScript Object Notation Graph (JSONG). For context, a brief explanation of JavaScript Object Notation is provided.

JavaScript Object Notation is a convention for representing data structures referred to as "objects" in a manner that is generally compatible with the JavaScript scripting language. Objects may include one or more elements, each of which is designated with a key. Each of the elements may be a string, a number, another object, an array, a Boolean value, or null. Arrays are ordered lists of elements delineated by square brackets "[" and "]." Elements in arrays are separated by commas. An example JSON object is presented below in Table 1.

TABLE 1

Example JSON Object

```
{
    "videos": [
        {
            id: 23432,
            title: "Eternal Sunshine of the Spotless Mind",
            boxart: "http://www.netflix.com/23432.png",
            synopsis: "A couple undergo a procedure to erase..."
        },
        {
            id: 23521,
            title: "The Mask",
            boxart: "http://www.netflix.com/5433.png",
            synopsis: "The Mask is a superhero who..."
        }
    ]
}
```

In the example JSON object presented above, the first and last curly brackets indicate the beginning and end of an object. "videos" is a key for the array of videos delineated by square braces "[" and "]." The array includes two elements, each delineated by curly braces. The first such element is an object that includes an "id" field, with value 23432, a "title" field, a "boxart" field, and a "synopsis" field with values as shown. Similarly, the second element in the array has the values as shown.

JSONG is an extension to JSON that implements the notions of paths and path-bound values as described above. In a JSONG object, each element in the object is associated with a path to that element. The path includes a sequence of keys that specifies a location in the JSONG object. Elements in a JSONG object correspond to the nodes described with respect to FIGS. 4-10, and comprise a path and a corresponding path-bound value. A path-bound value that is an array (i.e., delineated by square brackets) is deemed to be a forwarding node. The array is interpreted as a path to another location in the JSONG object. An example JSONG object is presented below in Table 2 for illustration.

TABLE 2

Example JSONG Object

```
{
  "videoLists": {
    "0": ["lists",1234],
    "1": ["lists",5233],
    //other lists omitted
    length: 50
  },
  "lists": {
    "1234": {
      path: ["lists",1234],
      "name": "New Releases",
      //other titles omitted
      "8": ["videos",32543],
      length: 75
    },
    "5233": {
      path: ["lists",5233],
      "name": "Action Movies",
      //other titles omitted
      "15": ["videos",32543],
      //other titles omitted
      length: 75
    },
    //other video lists omitted
  },
  "videos": {
    "32543": {
      path: ["videos",32543],
      title: "A Good Day to Die Hard",
      boxart: "http://cdn08.netflix.com/32543.png",
      synopsis: "An aging Bruce Willis returns for one more cynical..."
    },
    //additional titles omitted
  }
}
```

Conceptually, a JSONG object is hierarchically organized, with each element of the JSONG object belonging to a particular level. In the first level of the JSONG object depicted in table 2 are the elements "videoLists," "lists," and "videos." In the second level are the elements "0," and "1," for "videoLists," "1234" and "5233" for "lists" and "32543" for "videos." The third level includes additional elements as shown. Each of the elements in a JSONG object corresponds to a node described above with respect to FIGS. 4 and 5A-5B.

Any array in a JSONG object is interpreted as a path by a path evaluator 404. The "videoLists" element includes a number of elements that include arrays. For example, the element keyed as "0" includes the array ["lists",1234] and the element keyed as "1" includes the array ["lists",5233]. When examined by the path evaluator 404, the arrays indicate that the element is a translation element and that the path evaluator 404 should follow the path indicated by the array. In the example depicted in Table 2, if a client 402 requested that the path evaluator 404 evaluate the path ["videoLists", "0", "8", "title"], then the path evaluator would traverse this JSONG object to evaluate this path as follows. First, the path evaluator 404 would go to ["videoLists", "0"]. The path-bound value of this element is an array, meaning that ["videoLists", "0"] is a translation element. The path evaluator 404 translates ["videoLists", "0"] into what is shown in the array, which is ["lists",1234], and appends the remainder of the original path to produce the partially translated path ["lists", 1234, "8", "title"]. The path evaluator 404 then follows this path to ["lists", 1234, "8"], and sees that there is another array. The path evaluator examines this array, which is ["videos", 32543], and converts the partially translated path ["lists", 1234, "8", "title"] to ["videos", 32543, "title"]. Subsequently, the path evaluator 404 traverses the JSONG object to that location. At ["videos",32543, "title"] the path evaluator finds the path-bound value corresponding to the element "title", which is "A Good Day to Die Hard." The path evaluator 404 returns this path bound value, along with all translations performed along the way. These translations include:

["videoLists", "0"]→["lists",1234]
["lists",1234, "8"]→["videos", 32543]

The path-bound value and associated path are "A Good Day to Die Hard," and ["videos", 32543, title], respectively.

Table 3 provides an example implementation of an algorithm for path evaluation, written in the JavaScript scripting language. The details of the example implementation are in no way limiting. Persons of ordinary skill in the art will recognize that various modifications can be made to this implementation, and that path evaluation may be implemented in other programming languages, or in hardware.

TABLE 3

Example Path Evaluation Algorithm

```
function evaluatePath(root, evaluatedPath){
  vas context = root,
  path = [ ],
  keyIndex,
  key,
  result,
  errorThrown;
  for(var keyIndex = 0; keyIndex < evaluatedPath.length; keyIndex++) {
    key = evaluatedPath[keyIndex];
    // evaluating a null or undefined key is a noop
    if (key !== undefined && key !== null) {
      // break if the context is null, an Error, or a value type
      if (errorThrown || context instanceof Error || context ===
        undefined)
        break;
      path.push(key);
      try {
        if (context === null) {
          context = undefined;
        }
        context = context[key];
        // If we encounter a referene and we're not on the last key...
        if (context instanceof Array && keyIndex <
          evaluatedPath.length
          - 1) {
          // ...return the reference and translate the path and start
          evaluating from the root again.
          return [{path: path, value:
            context}].concat(evaluatePath(root,
            context.concat(evaluatedPath.slice(keyIndex + 1))));
        }
      }
      catch(error) {
        context = error;
        errorThrown = true;
        break;
      }
    }
  }
  result = {path: path};
  // If we short-circuited, include the full path being evaluated
  if (keyIndex < path.length) {
    result.evaluatedPath = evaluatedPath;
  }
  if (errorThrown === true) {
    result.error = context;
  }
  else {
    result.value = context;
```

TABLE 3-continued

Example Path Evaluation Algorithm

```
  }
  return [result];
}
```

In the implementation provided above, the evaluatePath function is a recursive function that accepts two arguments: "evaluatedPath," which is the path that is to be evaluated, and "root," which points to the root node of a JSONG object against which evaluatedPath is to be evaluated. The evaluatePath function includes a for-loop that iterates through the keys of evaluatedPath. In each iteration, a current key, represented by the variable "key" is appended to the variable "path," which starts out as an empty Array. Further, the variable "context" keeps track of the current node in the JSONG object. In each iteration, the variable "context" is updated by stepping through the JSONG object based on the variable "key."

During an iteration of the for-loop, if the current node, represented by the variable "context," is an Array ("if (context instance of Array)"), then the current node is a translation node. In this case, the line "return [{path: path, value: context}].concat(evaluatePath(root, context.concat (evaluatedPath.slice(keyIndex+1))));" is executed. This return line causes the current translation, as well as all translations provided by recursively called instances of evaluatePath, to be returned.

The portion of this return line that reads "return [{path: path, value: context}].concat( . . . " causes the currently determined translation, i.e., that the variable "path" evaluates to the variable "context," which is an array, to be returned. This portion of the return line also appends, through "concat," additional translations determined by a recursively called instance of evaluatePath.

The portion of this line that reads "evaluatePath(root, context.concat(evaluatedPath.slice(keyIndex+1)))" recursively calls another instance of the evaluatePath function, passing "root," and the concatenation of "context," which is an Array, with the remainder of the variable "evaluatedPath," as the path to be evaluated.

Recursion ends in a final recursively called instance of evaluatePath, which iterates through the provided path (again, the variable "evaluatedPath"), and determines that no translation nodes are present (by determining that context is never an Array). The for-loop is exited without recursively calling another instance of evaluatePath, and the variable "results" is set to be equal to {path: path, value: context}, which is then returned. This last return represents the path and path-bound value pair that is requested by the client, and is appended to all translations performed previously.

Because the if statement that checks whether "context" is an Array also checks whether the variable keyIndex (i.e., the iteration index) is less than the length of evaluatedPath−1, a final key in an evaluatedPath that points to a translation node is not translated. Instead, the Array associated with that final key is simply returned as the path-bound value (along with all other translations of course). In other words, in the implementation of the path evaluator algorithm depicted in Table 3, if the final key refers to a translation node in a graph object 412, then that final key is not translated. Instead, the Array that comprises the translation reference 510 is returned as the path-bound value associated with the final key. Although Table 3 depicts an implementation of the path evaluator algorithm in which the final key is not translated, in various embodiments of the path evaluator 404, the final key may or may not be translated.

Multi-Key References

Figure 6A:
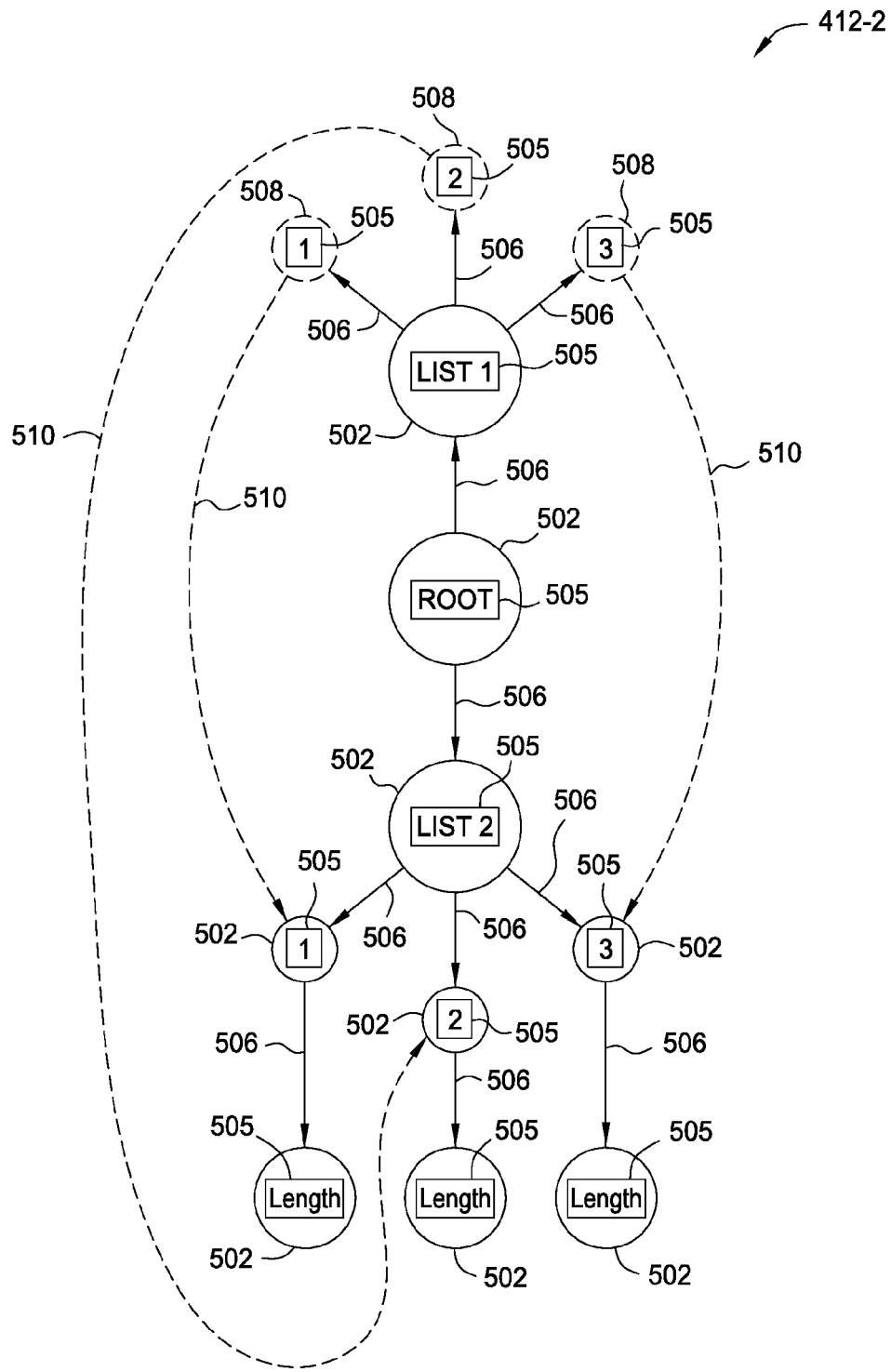
FIG. 6A illustrates an example graph object for illustrating the concept of multi-key references, according to another embodiment of the present invention.
Figure 6B:
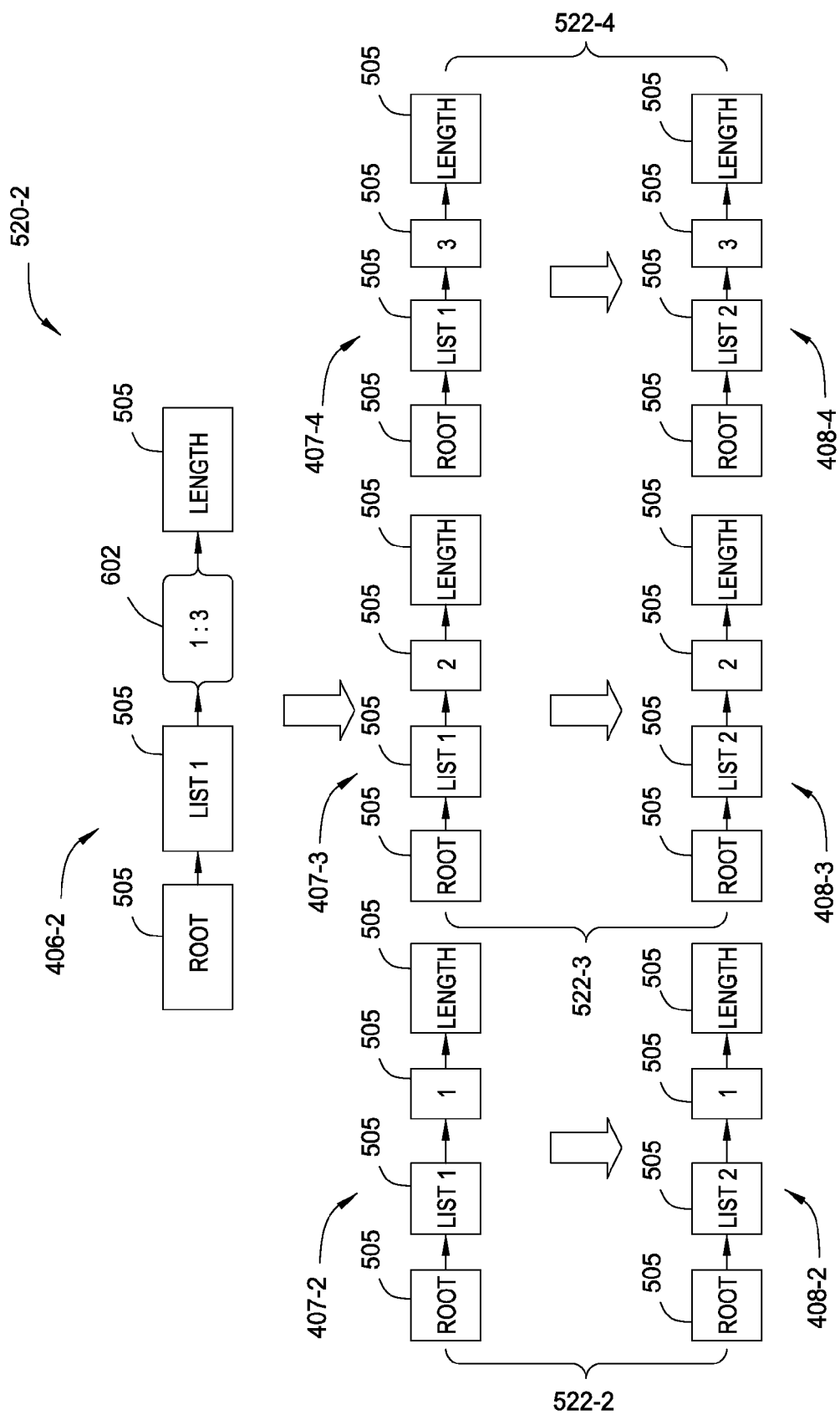
FIG. 6B illustrates an example translation of a path that includes a multi-key reference, according to one embodiment of the present invention.

Referring back now to FIG. 4, a path 406 provided by client 402 may include references to multiple pieces of payload data. To refer to multiple pieces of payload data, the path 406 should include at least one multi-key reference. The path evaluator 404 evaluates a path 406 that includes a multi-key reference by first expanding the path 406 that includes the multi-key reference into several individual paths, and then translating each such individual path as described above with respect to FIGS. 4-5B. Multi-key references may specify ranges or sets of keys. FIGS. 6A-6B illustrate in greater detail how paths that include multi-key references are translated.

FIG. 6A illustrates an example graph object 412-2 for illustrating the concept of multi-key references, according to one embodiment of the present invention. The graph object 412-2 includes a root node 502, normal nodes 504, directed edges 506, and translation references 510, and translation nodes 508, each with keys 505.

The graph object 412-2 includes a normal node 504 having the key 505 "List 1" and a normal node 504 having the key 505 "List 2." Both "List 1" and "List 2" include directed edges 506 that point to nodes with keys 505 that number from 1 to 3. However, the nodes pointed to by List 1 are translation nodes 508, while the nodes pointed to by List 2 are normal nodes 504. The translation nodes 508 pointed to by List 1 include translation references 510 to the normal nodes 504 nodes pointed to by List 2. Each of the normal nodes 504 1 to 3 include directed edges to normal nodes 504 that have the key 505 "Length." Each normal node 504 that has the key 505 "Length" also has a path-bound value that is not shown in FIG. 6A.

FIG. 6B illustrates an example translation 520-2 of a path 406-2 that includes a multi-key reference 602, according to an embodiment of the present invention. As shown, the translation 520-2 includes an initial path 406-2, partially translated path 407-2, partially translated path 407-3, partially translated path 407-4, fully translated path 408-2, fully translated path 408-3, and fully translated path 408-4.

The multi-key reference 602 includes a range of keys "1:3." To translate the path 406-2, the path evaluator 404 expands the multi-key reference 602 based on the range of keys. The range "1:3" is expanded into the keys 1, 2, and 3. Thus, the path evaluator 404 generates three partially translated paths 407, where each includes one of the keys derived from the range "1:3." Thus, the path evaluator 404 generates the partially translated path 407-2, which includes "Root, List 1, 1, Length," the partially translated path 407-3, which includes "Root, List 1, 2, Length," and the partially translated path 407-4, which includes "Root, List 1, 3, Length." Subsequently, the path evaluator 404 translates each of the partially translated paths. The path evaluator 404 translates the first partially translated path 407-2, by traversing the graph object 412-2 as specified by the keys 505 in the first partially translated path 407-2 until a translation node 508 is encountered. The first translation node 508 that is encountered is found at path "Root, List 1, 1." The path evaluator 404 follows the translation reference 510 to arrive at the node at path "Root, List 2, 1." Based on this translation, the path evaluator 404 generates the fully translated path 408-2, which points to the node specified by path "Root, List 2, 1, Length." The path evaluator 404 also similarly translates the partially translated path 407-3 and the partially translated path 407-4 into fully translated paths 408-3 and 408-4, respectively.

Figure 6C:
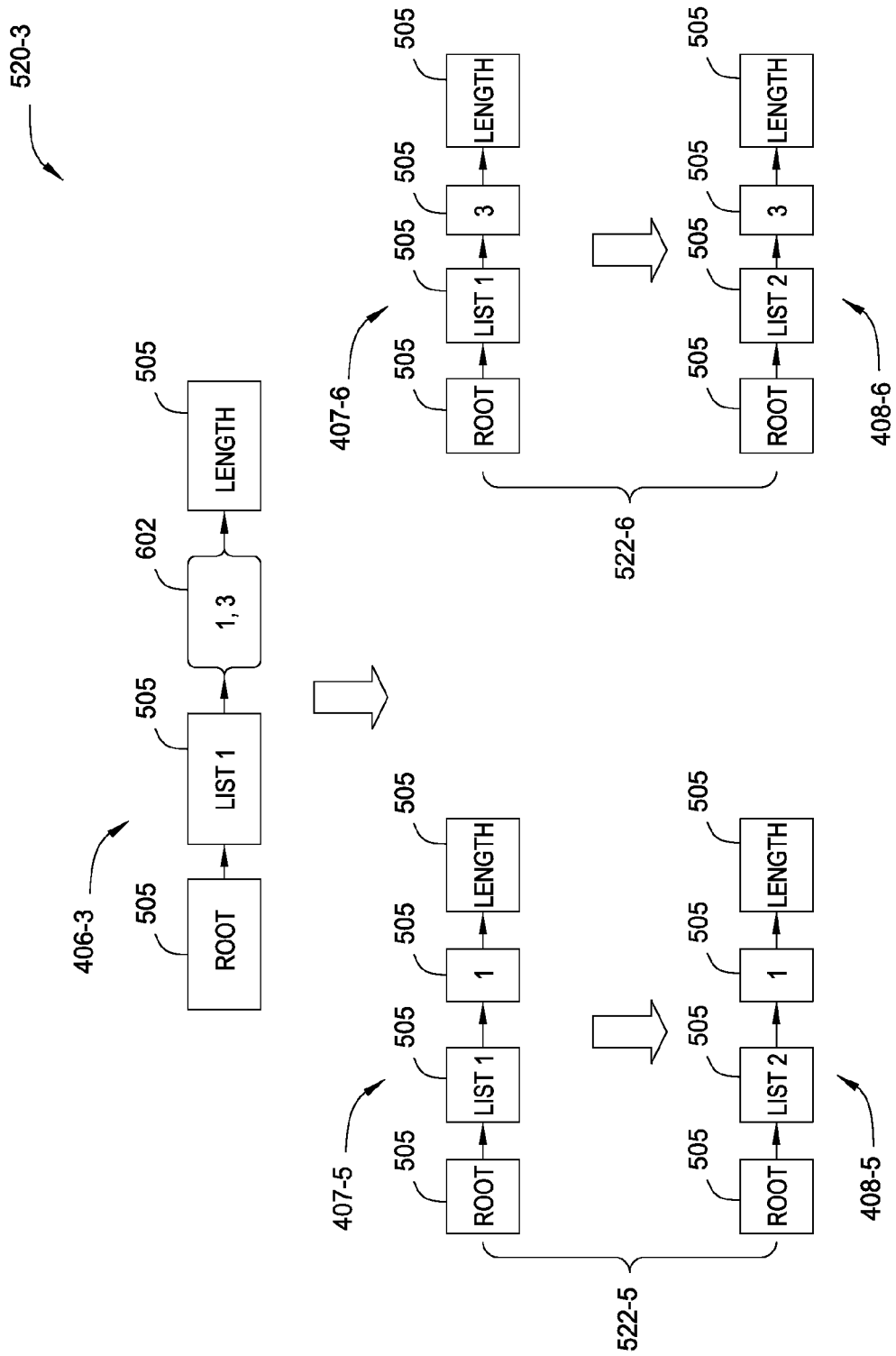
FIG. 6C illustrates an example translation of a path that includes a multi-key reference, according to another embodiment of the present invention.

In addition to ranges, multi-key references may also specify a set of multiple keys 505. FIG. 6C illustrates an example translation 520-3 of a path 406-3 that includes a multi-key reference 602, according to an embodiment of the present invention. As shown, the translation 520-3 includes an initial path 406-3, partially translated path 407-5, partially translated path 407-6, fully translated path 408-5, and fully translated path 408-6.

The multi-key reference 602 includes a set of keys "1, 3." To translate the path 406-3, the path evaluator 404 expands the multi-key reference 602 based on the range of keys. The range "1, 3" is expanded into the keys 1, and 3. Thus, the path evaluator 404 generates two partially translated paths 407, where each includes one of the keys derived from the set "1, 3." The path evaluator 404 generates the partially translated path 407-5, which includes "Root, List 1, 1, Length," and the partially translated path 407-6, which includes "Root, List 1, 3, Length." Subsequently, the path evaluator 404 translates each of the partially translated paths. The path evaluator 404 translates the first partially translated path 407-5, by traversing the graph object 412-2 as specified by the keys 505 in the first partially translated path 407-5 until a translation node 508 is encountered. The first translation node 508 that is encountered is found at path "Root, List 1, 1." The path evaluator 404 follows the translation reference 510 to arrive at the node at path "Root, List 2, 1." Based on this translation, the path evaluator 404 generates the fully translated path 408-5, which points to the node specified by path "Root, List 2, 1, Length." The path evaluator 404 also similarly translates the partially translated path 407-6.

A multi-path request allows the client 402 to transmit a single request, while being able to receive multiple path-bound values in return. Because the multi-path requests are expandable into multiple single-path requests, multi-path requests can be cached partially. Consequently, a client can search for resources within a single multi-path request in a local cache and, if necessary, can request any of the paths that the client 402 cannot find in the multi-path request.

Multi-Key References With JSONG

Multi-key references are now described with respect to the JSON extension "JSONG" discussed above. To obtain the first 50 titles in the first videoList depicted in Table 2, a client could generate the following single-path requests:
["videoLists",0,0]
["videoLists",0,0]
...
["videoLists",0,49]
However, with multi-path requests, a single request can specify all 50 titles:
["videoLists",0,{to:49}]

Identity Maps

Figure 7:
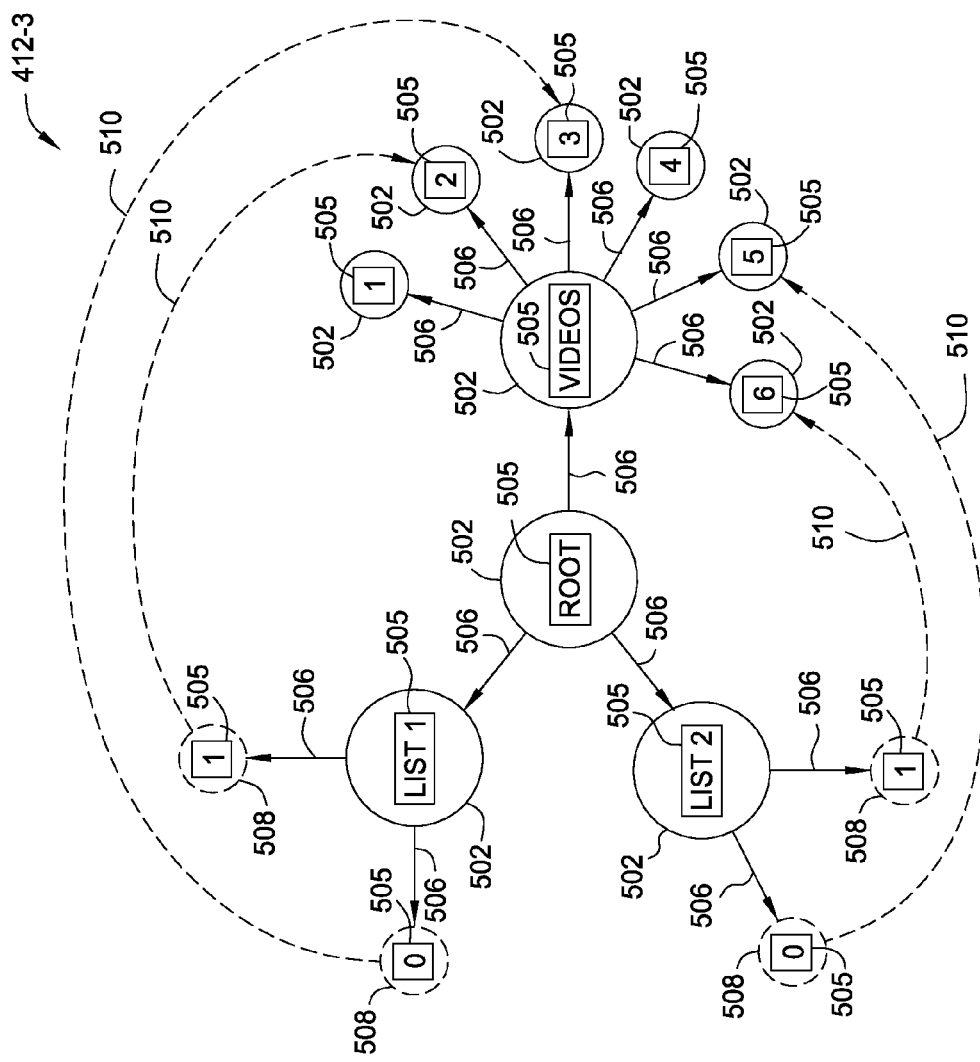
FIG. 7 illustrates an example graph object that includes an identity map, according to yet another embodiment of the present invention.

FIG. 7 illustrates an example graph object 412-3 that includes an identity map, according to one embodiment of the present invention. As shown, the graph object 412-3 includes three normal nodes 504 that include directed edges 506 to other nodes. The graph object 412-3 also includes translation nodes 508 and translation references 510.

For the purposes of organization, a graph object 412 is configured to include one or more identity maps. An identity map is a configuration in which all nodes that are deemed to be of a certain type are either translation nodes or are normal nodes 504 that reside at the end of a directed edge 506 that extends from a single normal node 504. Preferably, this single normal node 504 is only one directed edge 506 from the root node 502, i.e., at the first level of the graph object 412.

The node "List 1" includes nodes "0" and "1," which are both translation nodes 508. The node "List 2" includes nodes "0" and "1," which are also both translation nodes 508. The nodes "0" and "1" in both "List 1" and "List 2" are deemed to be of the same type as each other, as well as of the same type as the nodes in "Videos." In this example, all of these nodes are deemed to be of the type "videos." Thus, all of the nodes "0" and "1" in List 1 as well as "0" and "1" in List 2 are translation nodes 508 that include translation references 510 to nodes in the "Videos" node.

Conceptually, the identity map in the graph object 412-3 can be thought of as including an easily accessible listing of all nodes of a certain type—videos. If another node in the graph object 412-3 needs to reference a node of type video, then that node includes a reference to a node in "Videos." Therefore, all nodes of type videos that are not included in the node "Videos" include a translation reference 510 to a node in "Videos."

Asynchronous Data Delivery

In some embodiments, when the client 402 of FIG. 4 requests that a path evaluator 404 translate a path, the path evaluator 404 does not immediately return a translated path 408. Instead, the path evaluator 404 returns the translated path 408 asynchronously, i.e., at a later time. With asynchronous data delivery, the path evaluator 404 can return translated paths out of order. The path evaluator 404 can thus choose a time at which to return translated paths 408 to the client 402 that is in accordance with the order in which the path evaluator 404 actually translates the paths. In other words, if some path translations require a larger amount of time to execute, while other path translations require a smaller amount of time to execute, then the path evaluator 404 can provide the more quickly translated paths first, and the more slowly translated paths at a later time.

HTTP requests are traditionally responded to serially. In other words, HTTP requests are responded to in the order in which the requests are received by a server. By allowing asynchronous data delivery, requests provided by a client 402 may be transmitted in any order desired.

Figure 8:
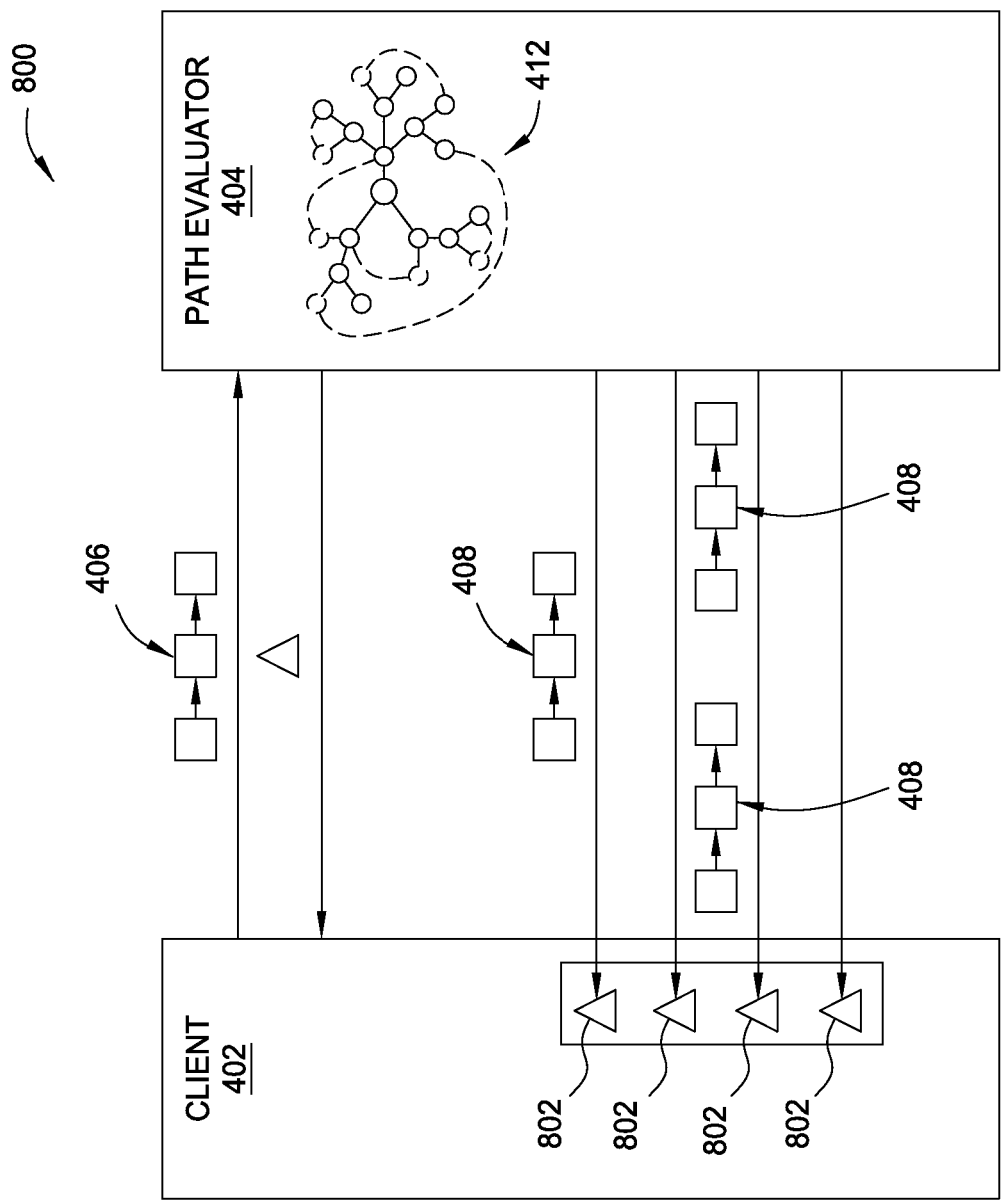
FIG. 8 illustrates a system illustrating asynchronous data deliver, according to one embodiment of the present invention.

FIG. 8 illustrates a system 800 illustrating asynchronous data delivery, according to one embodiment of the present invention. As shown, the system 800 includes a client 402 and a path evaluator 404.

Again, in operation, the client 402 transmits paths 406 to path evaluator 404. In response, path evaluator 404 transmits callback objects 802 to the client 402. A callback object 802 is a "promise" to return requested data at a point in the future. The client 402 stores the callback object 802. Subsequently, when the path evaluator 404 obtains translations 408 requested by the client 402, the path evaluator 404 calls the callback object to inform the client 402 that the data is available. The callback objects 802 can be called in any order, which means that the path evaluator 404 can provide obtained data in the order that the path evaluator 404 obtains the data.

The callback object can be implemented in JavaScript through the use of "Observables," which are constructs well-known in the art. In response to receiving a path 406 for translation, the path evaluator 404 returns an Observable to the client 402. The client 402 subscribes to the Observable, which allows the client 402 to receive data from the path evaluator 404 via the Observable.

Figure 9:
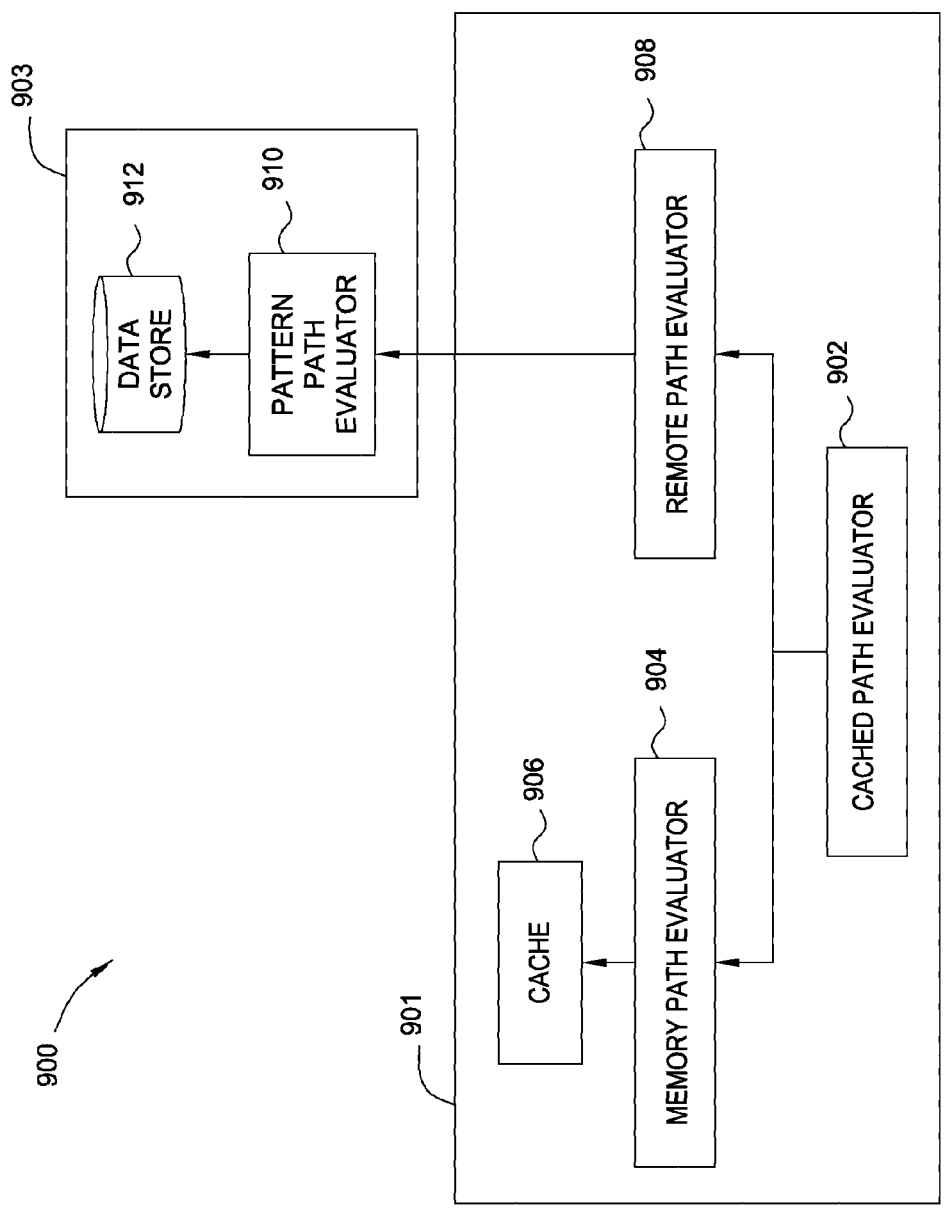
FIG. 9 illustrates a system configured to retrieve and cache remotely stored data, according to one embodiment of the present invention.

FIG. 9 illustrates a system 900 configured to retrieve and cache remotely stored data, according to one embodiment of the present invention. As shown, the system 900 includes a local computing device 901, which may be an endpoint device 108, and a remote computing device 903, which may be a content server 105.

The local computing device 901 includes several types of path evaluators, which work in conjunction to both search a local cache 906 for payload data and translations, and to update that cache 906 based on communication with the remote computing device 903. The remote computing device includes a pattern path evaluator 910 and a data store 912 for providing translations and payload data to the local computing device 901 if the cache 906 does not include such translations.

A memory path evaluator 904 evaluates requests for translations of paths 406 based on a local in-memory representation of a graph object 412, such as cache 906. A memory path evaluator 904 may be size-limited. Additionally, a memory path evaluator may implement cleanup mechanisms to prevent the in-memory representation (such as cache 906) of the graph object 412 from exceeding the specified size. In some embodiments, the memory path evaluator 904 implements cleanup mechanisms by deleting least-recently used objects.

A path pattern evaluator 910 evaluates requests for translations of paths 406 in an algorithmic way, rather than based on an explicit representation of a graph object 412. A path pattern evaluator may parse a path 406 provided by a client 402, rather than evaluating the path 406 explicitly against a representation of a graph object 412. The path pattern evaluator may dynamically generate path-bound values in response to receiving paths 406 from a client 402.

A remote path evaluator 908 communicates with a remote machine to translate paths provided by a client 402 to the remote path evaluator. For example, a remote path evaluator may execute request translation from another path evaluator executing on content server 105, while client 402, executing on endpoint device 108, requests translation of a path 406 from the remote path evaluator.

A cached path evaluator 902 works in conjunction with other path evaluators 404. The cache path evaluator accepts one path evaluator as a cache and accepts another path evaluator as a data source. The cached path evaluator accepts paths for translation 406 from a client 402. The cached path evaluator provides the paths 406 to the path evaluator that acts as the cache. The path evaluator that acts as the cache searches a local memory store for data to translate the paths 406 and provides any translated paths 408 back to the cached path evaluator. If the cached path evaluator does not receive all requested paths from the path evaluator that acts as the cache, then the cached path evaluator requests translation of the untranslated paths from the path evaluator that acts as the data source. When the data source provides the translations 408 back to the cached path evaluator, the cached path evaluator requests that the path evaluator that acts as the cache store the translations 408 in the local memory store for future access.

As explained above with reference to FIG. 4, all of the above-described types of path evaluators implement the following functionality. First, a path evaluator allows a client 402 to request payload data based on a path 406, as described above. Second, a path evaluator allows a client 402 to store a particular piece of payload data in the graph object 412, and to specify a path associated with that piece of payload data. Third, a path evaluator allows a client 402 to delete a particular piece of payload data from a graph object 412. Fourth, in some embodiments, a path evaluators allow clients 402 to request execution of a particular portion of executable code associated with a particular path. All path evaluators may act as a client 402 and request translations and payload data from other path evaluators.

In operation, the cached path evaluator 902 transmits a request to the memory path evaluator 904 for translation. The memory path evaluator 904 evaluates the paths received from the cached path evaluator 902 and determines whether the local cache 906 includes any translations and path-bound values for the paths received from the cached path evaluator 902. The memory path evaluator 904 transmits translations and path-bound values that are included in the local cache 906 to the cached path evaluator 902.

The memory path evaluator 904 informs the cached path evaluator 902 of any paths for which no data exists in local cache 906. More specifically, the local cache 906 may include information sufficient to generate a partially translated path 407 based on the path 406 provided by the cached path evaluator 902, but may not include sufficient information to generate a fully translated path 408. This lack of information may happen because the cache 906 has an incomplete representation of a graph object 412. For example, the cache 906 may include some normal nodes 504 and some translation nodes 508, but not all normal nodes 504 or translation nodes 508 to fully satisfy a request for translation.

After the memory path evaluator 904 informs the cached path evaluator 902 of what translations are stored in the cache 906, the cached path evaluator 902 transmits any untranslated paths to the remote path evaluator 908. In response, the remote path evaluator 908 provides the untranslated paths to the path pattern evaluator 910, which is local to a remote computing device 903. The path pattern evaluator 512 evaluates the paths provided by the remote path evaluator 908 and provides data from data store 912 back to the remote path evaluator 908. The remote path evaluator transmits the data to the memory path evaluator 904 for storage in the cache 906. The cached path evaluator 902 instructs the memory path evaluator 904 to store the translations and path-bound values received from the remote path evaluator 908 in the cache 906.

Figure 10:
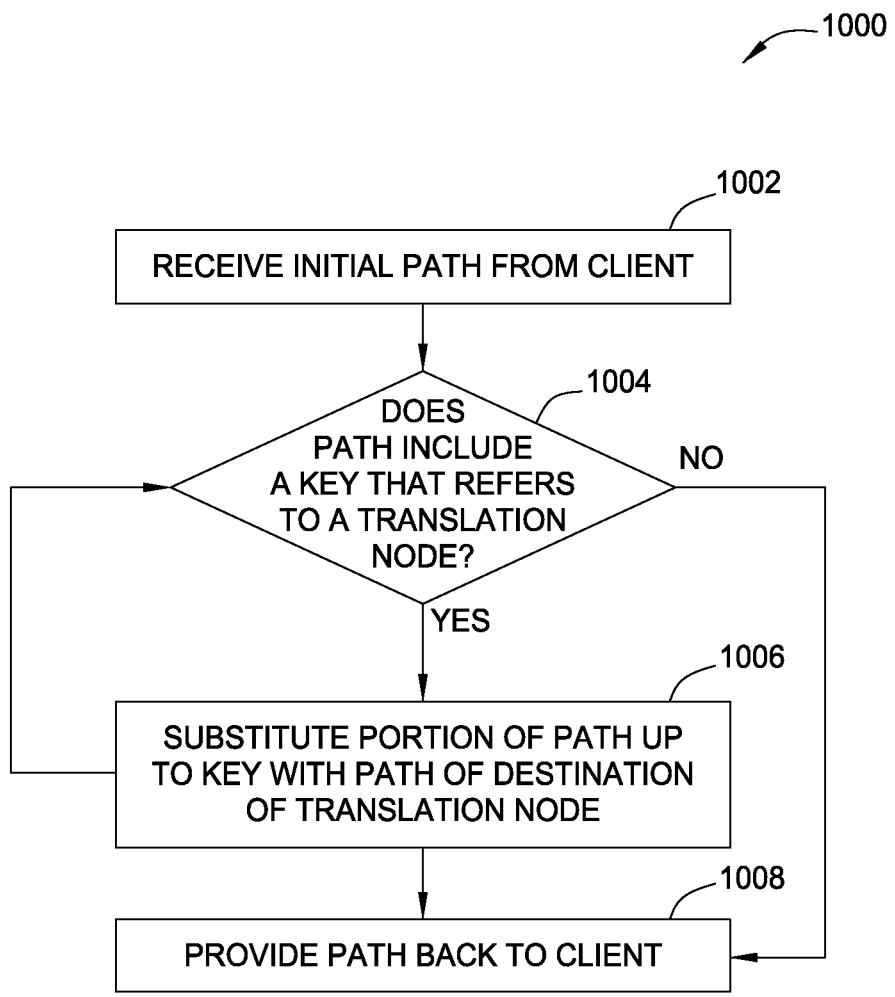
FIG. 10 is a flow diagram of method steps for evaluating a path, according to one embodiment of the present invention.

FIG. 10 is a flow diagram of method steps for evaluating a path, according to one embodiment of the present invention. Although the method steps are described in conjunction with FIGS. 1-9, persons skilled in the art will understand that any system configured to perform the method steps, in any order, falls within the scope of the present invention.

As shown, a method 1000 begins at step 1002, where the path evaluator 404 receives a path 406 from a client 402. In step 1004, the path evaluator 404 determines whether a portion of the path 406 refers to a translation node 508 in a graph object 412. If a portion of the path 406 refers to a translation node 508 in the graph object 412, then the path evaluator 404 follows the translation reference 510 of the translation node 508 to arrive at a new node and determines the path that corresponds to that new node. The path evaluator 404 substitutes the portion of the path with the path that corresponds to the new node. Subsequently, the method returns to step 1004. If a portion of the path 406 does not refer to a translation node 508, then the path is translated and the path evaluator 404 provides the path back to the client.

Figure 11:
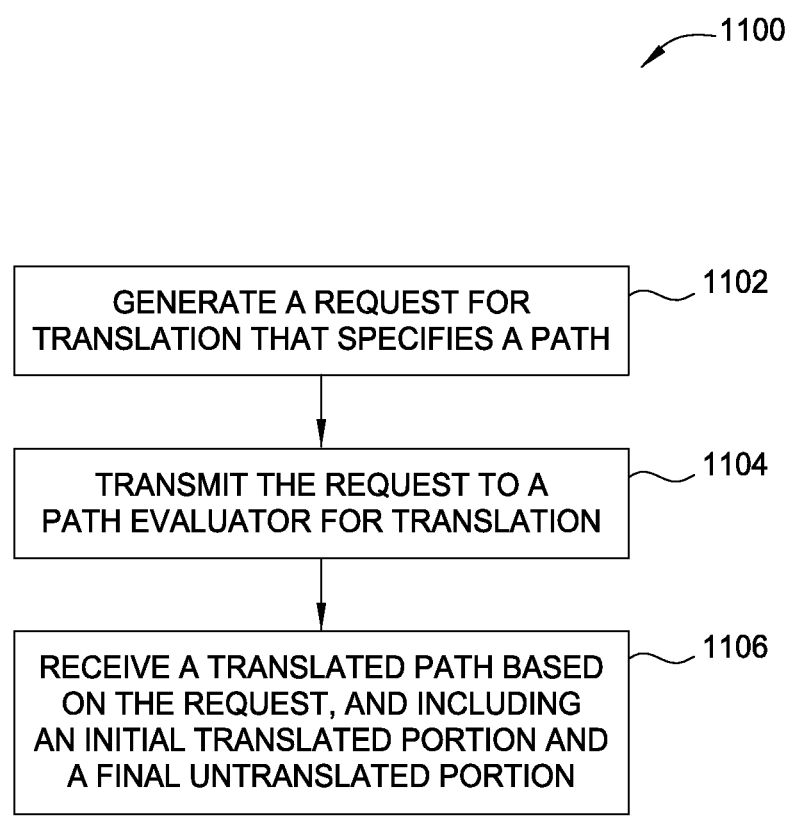
FIG. 11 is a flow diagram of method steps for requesting that a path be evaluated, according to one embodiment of the present invention.

FIG. 11 is a flow diagram of method steps for requesting that a path be evaluated, according to one embodiment of the present invention. Although the method steps are described in conjunction with FIGS. 1-9, persons skilled in the art will understand that any system configured to perform the method steps, in any order, falls within the scope of the present invention.

As shown, a method 1100 begins at step 1102, in which a client 402 generates a request for translation that specifies a path. In step 1104, the client 402 transmits the request to a path evaluator 404 for translation. In step 1106, the client receives a translated path based on the request, which includes an initial translated portion and a final untranslated portion.

Figure 12:
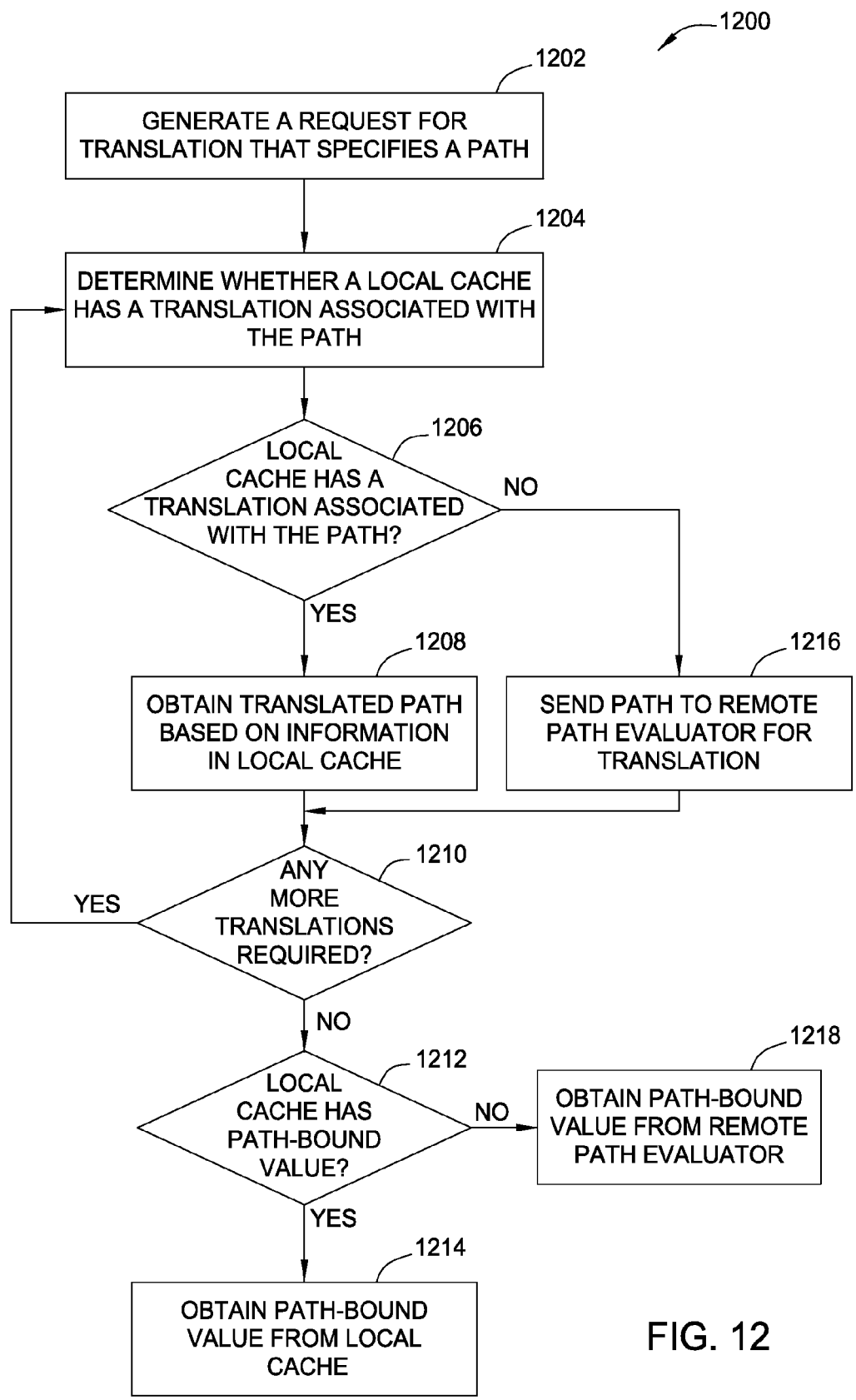
FIG. 12 is a flow diagram of method steps for requesting path translations from a cache, according to one embodiment of the present invention.

FIG. 12 is a flow diagram of method steps for requesting path translations from a cache, according to one embodiment of the present invention. Although the method steps are described in conjunction with FIGS. 1-9, persons skilled in the art will understand that any system configured to perform the method steps, in any order, falls within the scope of the present invention.

As shown, a method 1200 begins at step 1202, in which a cached path evaluator 902 generates a request for translation that specifies a path and transmits the request to a memory path evaluator 904. In step 1204, the memory path evaluator determines whether a local cache 906 has a translation associated with the path. In step 1206, if the local cache 906 has the translation, then the method proceeds to step 1208, in which the memory path evaluator 904 obtains a translated path based on the information in the local cache 906. Subsequently, in step 1210, the memory path evaluator 904 determines if the path requires any more translations. If the path requires more translations, then the method returns to step 1204. If the path does not require any more translations, then the method proceeds to step 1212, in which the memory path evaluator 904 determines whether the local cache 906 has a path-bound value associated with the translated path. If the local cache 906 does have the path-bound value, then the memory path evaluator 904 obtains the path-bound value from the local cache 906. If the local cache 906 does not have the path-bound value, then the memory path evaluator 904 informs the cached path evaluator 902 that the local cache 906 does not have the path-bound value. In step 1218, the cached path evaluator 902 requests the path-bound value from the remote path evaluator 908.

Returning to step 1206, if the local cache 906 does not have a translation associated with the path, then the method proceeds to step 1216. In step 1216, the memory path evaluator 904 informs the cached path evaluator 902 that the local cache 906 does not have a translation. The cached path evaluator 902 then requests that translation from the remote path evaluator 908, which requests the translation from the pattern path evaluator 910 on the remote computing device 903. Subsequently, the pattern path evaluator 910 obtains the translation from the data store 912 and returns the translation to the remote path evaluator 908, which requests that the translation be stored in the local cache 906. After step 1216, the method proceeds to step 1210.

In sum, an improved approach is provided for generating, transmitting, and evaluating requests for payload data. According to this approach, each piece of payload data is associated with a path that is deemed to be a unique path. Other paths may be associated with the piece of payload data, but those other paths are not unique. In operation, a client transmits, to a path evaluator, a request for payload data that specifies a path. The path evaluator traverses a graph object in accordance with the path. If the path evaluator encounters a translation node, then the path evaluator follows a translation reference of the translation node to arrive at a new node. The path evaluator then determines the path of the new node. The path evaluator substitutes the portion of the path up to the translation node with the path of the new node. The path evaluator continues searching through the graph object and substituting portions of the path until the path evaluator does not find any more translation nodes. At this point, the path is translated and the path evaluator transmits the path as well as payload data to the client.

One advantage of the disclosed approach is that for each piece of payload data, a single unique path to the payload data exists, which allows for that payload data to be cached with the unique path as the cache key. Another advantage is that a single request for payload data can specify multiple resources, which may each be stored or not stored in a cache. Consequently, all resources specified by the single request for payload data that are stored in the cache may be obtained from the cache, while other resources that are not stored in the cache may be obtained remotely. A further advantage is that the requests for payload data may be fulfilled out of order with callback objects.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What we claim is:

1. A computer-implemented method comprising:
generating a first request for translation that specifies a first path configured to identify first payload data downloaded over a network and cached in a graph object, wherein the first path comprises a non-unique path through the graph object and includes a sequence of keys that identifies a relationally defined location of the payload data in the graph object;
transmitting the first request to a path evaluator for translation based on the sequence of keys included in the first path;
receiving a first translated path based on the first path from the path evaluator, wherein the first translated path comprises a unique path through the graph object; and
receiving the first payload data from the path evaluator.

2. The computer-implemented method of claim 1, further comprising storing, in a local cache memory, a first cache entry including a first translation that comprises an indication that the first path translates to the first translated path.

3. The computer-implemented method of claim 2, further comprising storing, in the local cache memory, a second cache entry including an indication that the payload data is associated with the first translated path in the graph object.

4. The computer-implemented method of claim 3, wherein within the second cache entry, the first translated path comprises a cache key associated with the payload data.

5. The computer-implemented method of claim 1, wherein the first request comprises a multi-key reference, and further comprising receiving a plurality of translations in response to transmitting the first request to the path evaluator, wherein each translation in the plurality of translations is associated with a different key corresponding to the multi-key reference.

6. The computer-implemented method of claim 5, further comprising storing each translation in the plurality of translations in a local cache memory.

7. The computer-implemented method of claim 1, further comprising:
receiving a callback object in response to transmitting the first request; and
in response, subscribing to the callback object in order to receive translated paths and payload data via the callback object.

8. The computer-implemented method of claim 7, wherein the first translated path and the first payload data are received via the callback object.

9. A computer system, comprising:
a memory that includes a set of instructions; and
a processing device that is coupled to the memory and, when executing the set of instructions, is configured to:
generate a first request for translation that specifies a first path configured to identify first payload data downloaded over a network and cached in a graph object, wherein the first path comprises a non-unique path through the graph object and includes a sequence of keys that identifies a relationally defined location of the payload data in the graph object;
transmit the first request to a path evaluator for translation based on the sequence of keys included in the first path;
receive a first translated path based on the first path from the path evaluator, wherein the first translated path comprises a unique path through the graph object; and
receive the first payload data from the path evaluator.

10. The computer system of claim 9, wherein the processing device is further configured to store, in a local cache memory, a first cache entry including a first translation that comprises an indication that the first path translates to the first translated path.

11. The computer system of claim 10, wherein the processing device is further configured to store, in the local cache memory, a second cache entry including an indication that the payload data is associated with the first translated path in the graph object.

12. The computer system of claim 11, wherein within the second cache entry, the first translated path comprises a cache key associated with the payload data.

13. The computer system of claim 9, wherein the first request comprises a multi-key reference, and the processing device is further configured to receive a plurality of translations in response to transmitting the first request to the path evaluator, wherein each translation in the plurality of translations is associated with a different key corresponding to the multi-key reference.

14. The computer system of claim 13, wherein the processing device is further configured to store each translation in the plurality of translations in a local cache memory.

15. The computer system of claim 9, wherein the processing device is further configured to:
receive a callback object in response to transmitting the first request; and
in response, subscribe to the callback object in order to receive translated paths and payload data via the callback object.

16. The computer system of claim 15, wherein the first translated path and the first payload data are received via the callback object.

17. A non-transitory computer-readable medium storing instructions that when executed by a processor, cause a computer system to:
generate a first request for translation that specifies a first path configured to identify first payload data downloaded over a network and cached in a graph object, wherein the first path comprises a non-unique path through the graph object and includes a sequence of keys that identifies a relationally defined location of the payload data in the graph object;
transmit the first request to a path evaluator for translation based on the sequence of keys included in the first path;
receive a first translated path based on the first path from the path evaluator, wherein the first translated path comprises a unique path through the graph object; and
receive the first payload data from the path evaluator.

* * * * *